(12) United States Patent
Bitar

(10) Patent No.: US 9,749,224 B2
(45) Date of Patent: Aug. 29, 2017

(54) METHOD AND APPARATUS FOR CLOUD PROVISIONING OF COMMUNICATION SERVICES

(71) Applicant: Verizon Patent and Licensing Inc., Arlington, VA (US)

(72) Inventor: Nabil N. Bitar, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 278 days.

(21) Appl. No.: 14/230,871

(22) Filed: Mar. 31, 2014

(65) Prior Publication Data

US 2015/0281046 A1 Oct. 1, 2015

(51) Int. Cl.
| | |
|---|---|
| *G06F 15/173* | (2006.01) |
| *H04L 12/725* | (2013.01) |
| *H04L 29/08* | (2006.01) |
| *G06F 21/62* | (2013.01) |
| *H04L 29/06* | (2006.01) |
| *H04L 12/24* | (2006.01) |

(52) U.S. Cl.
CPC ........ *H04L 45/308* (2013.01); *G06F 21/6218* (2013.01); *H04L 41/5051* (2013.01); *H04L 63/0272* (2013.01); *H04L 67/306* (2013.01); *G06F 2221/2101* (2013.01); *H04L 41/5096* (2013.01); *H04L 63/0823* (2013.01); *H04L 63/102* (2013.01)

(58) Field of Classification Search
CPC ... H04L 12/2859; H04L 63/10; H04L 63/105; H04L 63/102; H04L 41/5096; H04L 45/308; H04L 67/306; H04L 63/0272; H04L 41/5051; G06F 2221/2101

USPC ......................................................... 709/238
See application file for complete search history.

(56) References Cited

U.S. PATENT DOCUMENTS

| | | | | |
|---|---|---|---|---|
| 8,429,659 B2* | 4/2013 | Bartfai-Walcott | .... | G06F 9/5072 718/103 |
| 8,543,660 B2* | 9/2013 | Roberts | ............ | H04N 21/23113 706/50 |
| 8,832,249 B2* | 9/2014 | Kuo | ....................... | G06F 9/5011 709/223 |
| 8,950,009 B2* | 2/2015 | Vijayan | .................... | G06F 21/60 726/31 |
| 9,207,993 B2* | 12/2015 | Jain | ........................ | G06F 9/5094 |
| 2010/0332401 A1* | 12/2010 | Prahlad | ................ | G06F 17/3002 705/80 |
| 2012/0158821 A1* | 6/2012 | Barros | ............... | G06F 17/30563 709/203 |
| 2014/0086177 A1* | 3/2014 | Adjakple | ............... | H04W 12/08 370/329 |

(Continued)

*Primary Examiner* — Phuoc Nguyen

(57) ABSTRACT

An approach for cloud provisioning of consumer services based on requested services. The approach uses customer request for services and current network utilization patterns to most efficiently and effectively provision network resources. For example, a network manager establishes one or more terms for a cloud provider based on one or more provider network provisions. The network manager further determines a customer profile subscription based on customer credentials, cloud provider credentials, and a combination thereof. Then, the network manager delivers one or more credentials based on the cloud provider, and generates a routing path to the cloud provider based on the subscription and/or service request.

20 Claims, 9 Drawing Sheets

(56) References Cited

U.S. PATENT DOCUMENTS

2015/0131444 A1* 5/2015 Malatack ............ H04M 7/0021
370/235

* cited by examiner

METHOD AND APPARATUS FOR CLOUD PROVISIONING OF COMMUNICATION SERVICES

BACKGROUND INFORMATION

Service providers are continually challenged to deliver value and convenience to customers by, for example, providing compelling network services. One area of development has been cloud based services that enable providing on-demand compute, storage, software service, and platform service among others to enterprises. This on-demand convenience has spawned significant adoption by an ever-growing number of consumers. Communication between Enterprise sites and the cloud-based services today often relies on building overlays over existing connections between the cloud provider and the enterprise site. These overlays require capabilities, such as IP tunneling, on both ends and provisioning but do not involve the network service provider underlay network. Thus, the connection capacity is limited to what is provided by the undelay network service provider networks. An Enterprise currently must predict their service needs prior to use and include those extra costs prior to need. Should unpredictable needs occur, enterprises need to order additional services and wait for them to be provisioned by the service provider. It is often the case that an enterprise has a virtual private network (VPN) provided by a network service providers that interconnects its private sites. Thus, leveraging that by dynamically, connecting a new cloud-based service to that VPN, will not require any additional networking capabilities at the enterprise site. However, it requires interaction with the network service to create the connectivity needed to the enterprise VPN at the cloud-provider side. There are also cases where the cloud service provider buys network services from a network service provider to interconnect its own data centers. The demand among these data centers and the type of connectivity could also be time variant. Unfortunately, dynamic provider-based network services based on need have not been available in all these cases.

Based on the foregoing, there is a need for efficient provisioning of communication services. The goal may be to offer services that satisfy the requirements of individual users while guaranteeing at the same time an efficient utilization of network resources.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for dynamically determining network services based on consumer service need, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to processing and dynamically determining network services based on routing traffic, it is contemplated that these embodiments have applicability to systems operated by different organizations and to other operations wherein dynamically determining network services based on routing traffic.

Figure 1:
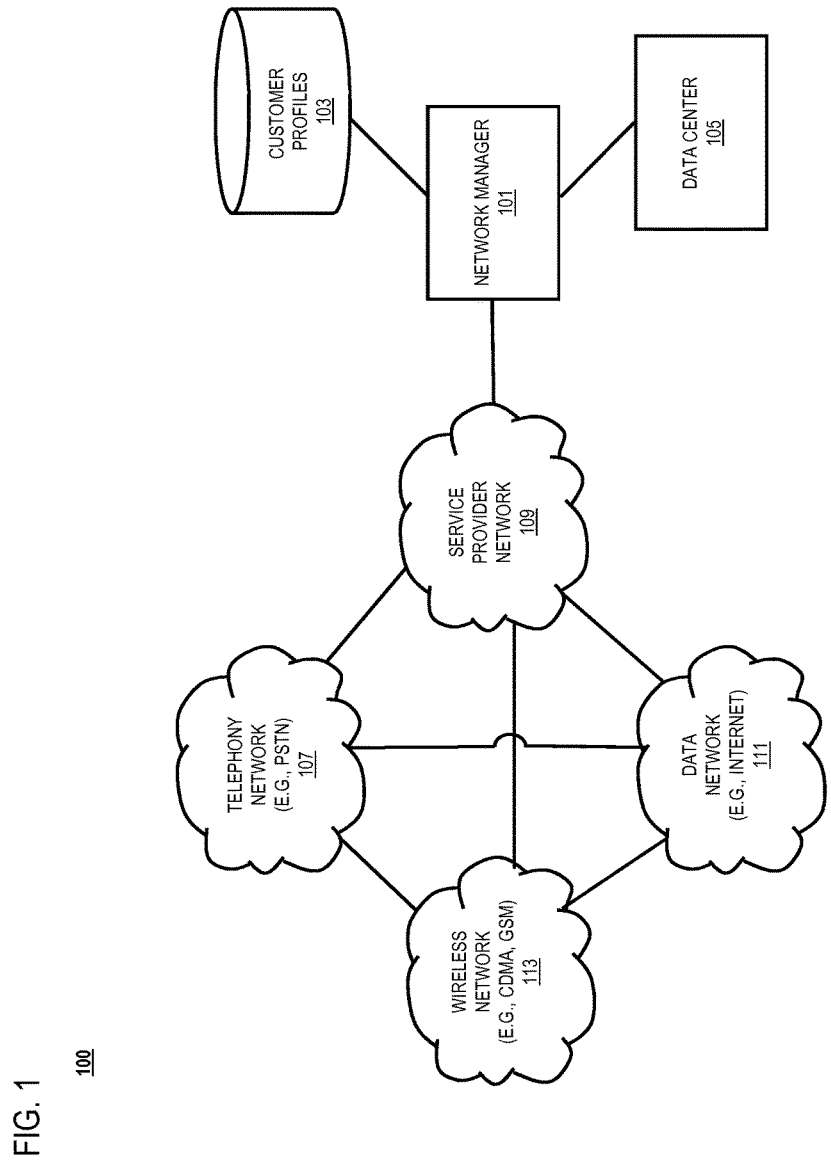
FIG. 1 is a diagram of a system capable of dynamically determining network services based on routing traffic, according to an exemplary embodiment.

FIG. 1 is a diagram of a system capable of determining a cloud provider identifier associated with a request and validating the request to provision one or more communication services, according to exemplary embodiment. For the purposes of illustration, system 100 for providing communication services to request sending cloud provider is described. In one embodiment, the network manager 101 has connectivity to data center 105 and customer profiles database 103 via networks 107, 109, 111 and 113.

In exemplary embodiments, any number of customers may access the network manager 101 through any mixture of tiered public and/or private communication networks. According to certain embodiments, these public and/or private communication networks can include a data network, a telephony network, and/or wireless network. For example, the telephony network may include a circuit-switched network, such as the public switched telephone network (PSTN). The wireless network may employ various technologies including, for example, code division multiple access (CDMA), enhanced data rates for global evolution (EDGE), general packet radio service (GPRS), mobile ad hoc network (MANET), global system for mobile communications (GSM), universal mobile telecommunications system (UMTS), etc., as well as any other suitable wireless medium, e.g., WiMAX, wireless fidelity (WiFi), satellite, and the like. Additionally, the data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In one embodiment, the network manager 101 accesses a customer profiles database 103 to determine the communication services to be applied. Depending on the security service that is involved, the network manager 101 may route the request through the public networks 107-113. In one embodiment, the network manager 101 intercepts the data flow, and accesses the customer profiles database 103 to determine the security services to be performed for the target customer. In one embodiment, the network manager 101 may examine customer information stored in a customer profiles database 103, which contains information pertaining to the customers associated with the session over which the provisioning request is received.

In one embodiment, based on request validation, relevant data that can be used to generate recommendations and insight is propagated to the network manager 101, in accordance with policies, through a cloud interface which may be independent from the data model used. The policies may be stored in local storage 217, in the network manager 101, or a combination thereof. The networks 107-113 are similarly configured with a policy that causes a reaction to new device data and in turn, initiate processing.

The approach of the system 100 stems, in part, from the recognition that there is a need for dynamic provisioning of communication services for maximizing resource utilization and satisfying the customer requirements.

As shown, the system 100 includes the network manager 101 implemented as, for example, part of a service provider network 109 for determining a cloud provider identifier associated with a request and validating the request to provision one or more communication services. However, in alternative embodiments, the network manager 101 could be implemented as any part of the system 100.

In one embodiment, the service provider network 109 can interact with one or more other networks, such as a telephony network 107, a data network 111, and/or a wireless network 113.

Although depicted as separate entities, networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions.

In one embodiment, the network manager 101 may be a platform with multiple interconnected components. The network manager 101 may include multiple servers, intelligent networking devices, computing devices, components and corresponding software for determining a cloud provider identifier associated with a request and validating the request to provision one or more communication services. In one scenario, computing on the cloud requires vigilance about security, manageability, standards, governance, and compliance, Therefore, the network manager 101 encapsulates rules and behaviors for cloud infrastructures around datacenter constructs (storage, cluster, network, security, etc.) that an application might need. The network manager 101 may represent the rules and behaviors unique to each cloud provider, thereby capturing the best practices on any given cloud.

In one embodiment, a network manager 101 may determine, at least in part, a valid request from a cloud provider, wherein a valid request comprises of a valid identification for a cloud provider. In one embodiment, network manager 101 may receive a request from a cloud provider for provisioning of one or more communication services, whereby the network manager 101 may determine a cloud provider identifier and may initiate a process for validating the request. Then, the network manager 101 matches the cloud provider identifier against another copy of the cloud provider identifier associated with a session to validate the request. In one embodiment, validating a request may be further based on matching one or more parameters in the request against the context of a cloud provider associated with the cloud provider identifier.

In one embodiment, the network manager 101 may process and/or facilitate a processing of information associated with one or more cloud providers to cause, at least in part, a matching of the one or more parameters in the request against the context of a cloud provider. In one embodiment, the network manager 101 upon determining that the one or more parameters in the request matches the context of a cloud provider, may initiate provisioning the one or more requests based on the validating of the requesting. Thereby, the network manager 101 may cause, at least in parts, a dynamic provisioning of communication services. In one scenario, the network manager 101 may cause a dynamic provisioning of virtual private network services, whereby one or more virtual private network sessions may be established over a service provider data network according to a multiprotocol labeling switching protocol.

In one embodiment, the network manager 101 may process and/or facilitate a processing of the one or more cloud providers to determine one or more criteria, one or more parameters, or a combination thereof for initiating a provisioning the one or more requests based on the validating of the requesting. In one embodiment, one or more criteria may include one or more data types, one or more propagation types, one or more network interactions, network availability information, resource availability information, device capability information, contextual information or a combination thereof. In one embodiment, one or more parameters may include a customer identifier, a shared secret, service profile information, or a combination thereof. In one embodiment, the network manager 101 causes, at least in part, an orchestration of one or more network systems based, at least in part, on the matching.

In one embodiment, the network manager 101 may cause a parsing of the request to determine one or more operation codes and/or one or more service parameters, and may further generate a response message indicating a status of the provisioning.

In one embodiment, the network manager 101 may be caused by a customer or an application automatically calling the network manager 101. The application may automatically generate parameters used in making a provisioning request in order to better utilize network resources and quickly and efficiently apply changes to customer provisions. In this way, use of certain applications requiring greater network resources may expand provisioned resources. In other embodiments, exiting an application may automatically reduce the provisioned resources.

In one embodiment, data center 105 may be a centralized repository, either physical or virtual, for the storage, management, and dissemination of data and information organized around a particular infrastructure. In one embodiment, the network manager 101 upon causing, at least in part, a matching of one or more strings selected by the at least one cloud provider may cause dynamic provisioning of WAN services between a cloud provider and data center 105 of the cloud provider. In one scenario, the network manager 101 may include utilization of a set of shared computing resources which may be consolidated in one or more data center 105.

Figure 2:
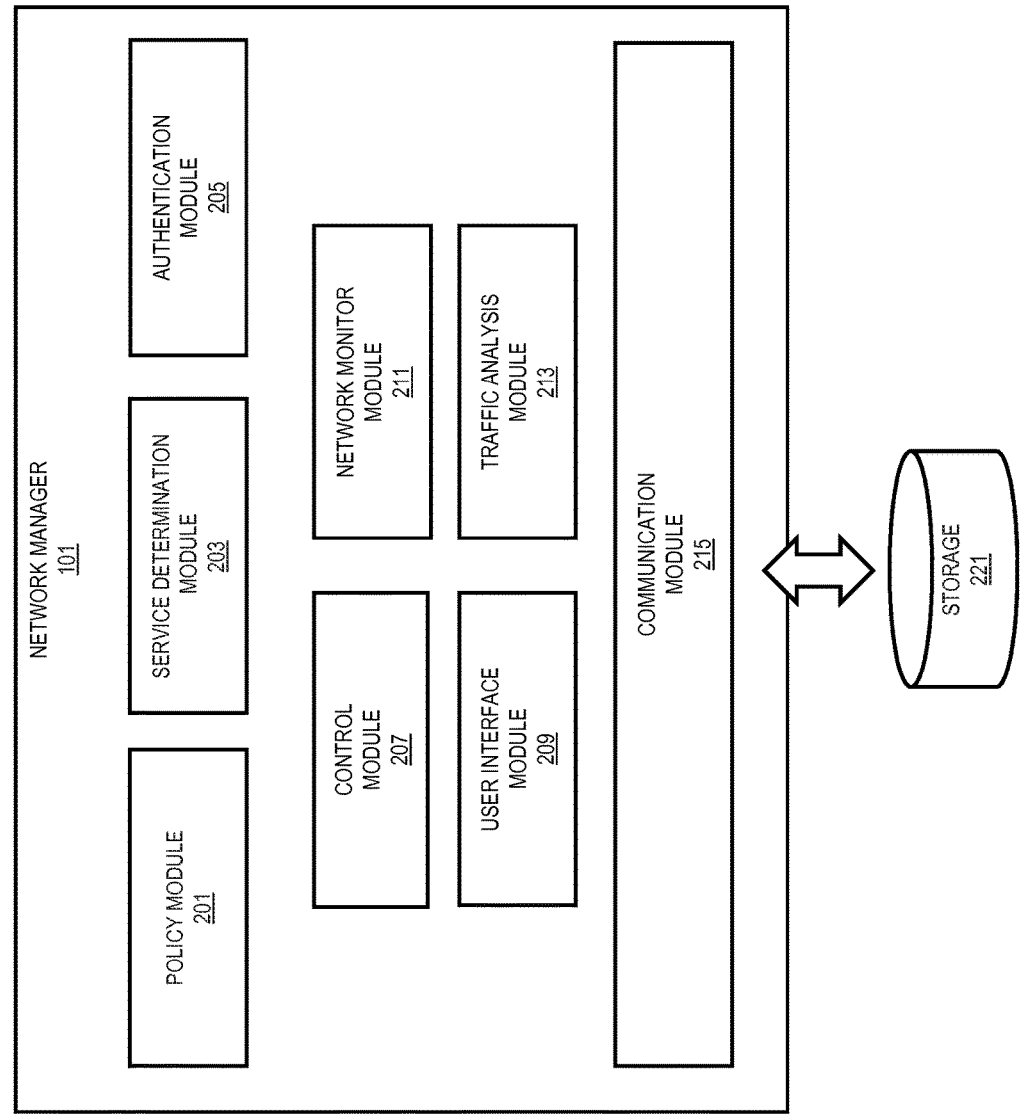
FIG. 2 is a diagram of a platform capable of dynamically determining network services based on routing traffic, according to an exemplary embodiment.

FIG. 2 is a diagram depicting the components of the network manager 101, according to one embodiment. The network manager 101 includes various executable modules for performing one or more computing, data processing and network based instructions that in combination provide a means for determining a cloud provider identifier associated with a request and validating the request to provision one or more communication services. Such modules can be implemented in hardware, firmware, software or a combination thereof. By way of example, the network manager 101 may include a policy module 201, a service determination module 203, an authentication module 205, a control module 207, a user interface module 209, a network monitor module 211, a traffic analysis module 213, and a communication module 215. These modules 201-215 can interact with storage 221 in support of their functions. According to some embodiments, the storage 221 is maintained and updated based, at least in part, on one or more transactions conducted with user devices pertaining to various applications and functions of the network manager 101.

In one embodiment, the policy module 201 determines one or more terms for cloud provisioning of network services. The terms may be associated with determining a request sending cloud provider identifier and validating the request for the provisioning of one or more communication services, including but not limited to firewalls, proxies, deep packet inspection and other non-standard IP routing. The policy module 201 may also determine one or more terms for initiating a subscription and provisioning of the one or more requests based on the validating of the requesting. In one embodiment, the policy module 201 may determine that a validation of a request for one or more communication services may include matching of the one or more parameters against the context of a cloud service provider. In one embodiment, the policy module 201 may determine that the one or more parameters may include a customer identifier and/or a shared secret and/or a service profile information. The policies may be retrieved by the other modules for processing from the storage 221.

In one embodiment, the service determination module 203 processes the one or more subscribed services to determine communication network resources needed. The service determination module 203 determines the provided network resources based, at least in part, on one or more data types, one or more propagation types, one or more network interactions, network availability information, resource availability information, device capability information, temporal information, contextual information, services that can be connected, services that are connected, location, bandwidth, customer identification, or a combination thereof.

In one embodiment, an authentication module 205 authenticates users for interaction with the network manager 101. The authentication procedure may be established a first time via a signup process then later executed by the subscribed device for enabling profile activation. By way of example, the signup procedure may include user entry of contact information, device information and user device usage preferences.

In one embodiment, the control module 207 controls the operations of the various other modules of the network manager 101, including triggering execution of different modules accordingly. For example, the control module 207 identifies which services and/or applications are configured with an interface element for facilitating access to the communication services.

In one embodiment, the user interface module 209 enables users to interact with the network manager 101. This includes, for example, enabling user registration and/or access to the communication services. It is noted that the user interface be by way of various APIs or other function calls at a computing device of the third party content provider.

In one embodiment, the network monitor module 211 monitors and notifies of changes in the network using the network manager 101. The network monitor module 211 may act in conjunction with the other modules in order to follow policies with respect to changes in path. For example, a router within a network may stop working for whatever reason and the network path compromised thus causing a change in network path. The changed network path used which may be decided in combination with any necessary policies applied is for more efficient network resource usage. Similarly, should a router link become congested, traffic may be diverted to another route by choosing a path with less traffic.

In one embodiment, the traffic analysis module 213 monitors traffic from users in deciding a network path using the network manager 101. The traffic analysis module 217 may act in conjunction with the other modules in order to follow policies with respect to changes in path. For example, the network path may be decided by policies and by magnitude and direction of traffic.

In one embodiment, the communication module 215 executes various protocols and data sharing techniques for enabling collaborative execution between the network manager 101, data center 105 and the networks 107-113. In addition, the communication module 215 enables generation of signals for communicating with various elements of the service provider network, including various gateways, policy configuration functions and the like.

Figure 3:
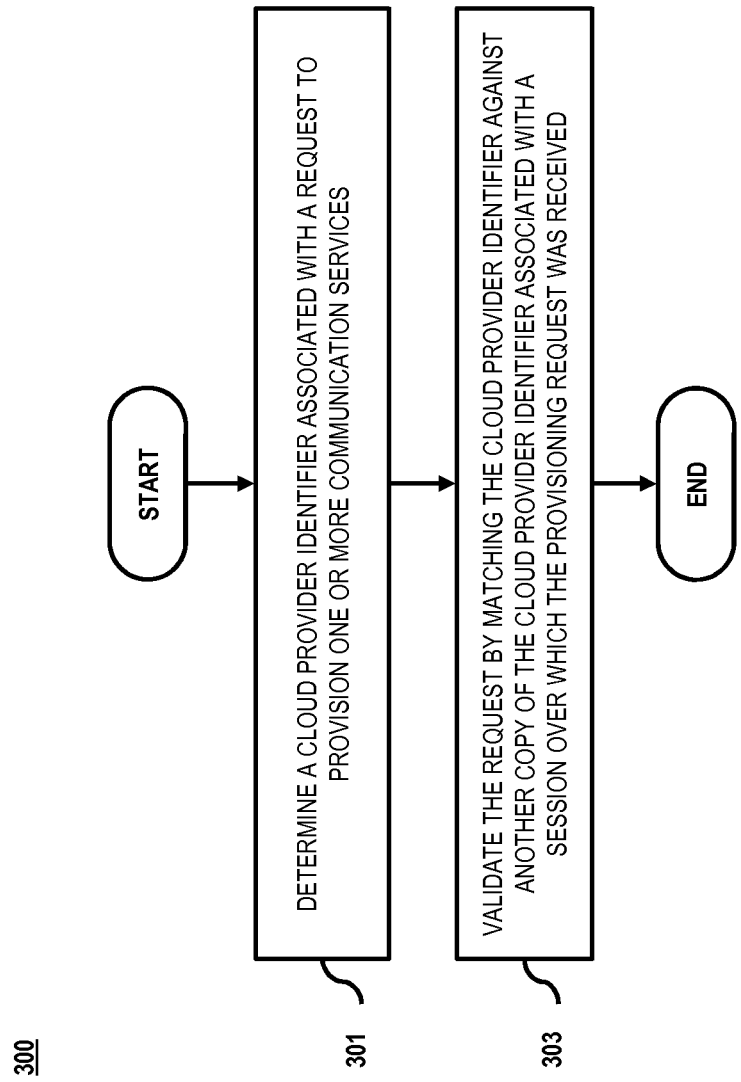
FIG. 3 is a flowchart of a process for determining a cloud provider identifier associated with a request and validating the request to provision one or more communication services, according to one embodiment.
Figure 7:
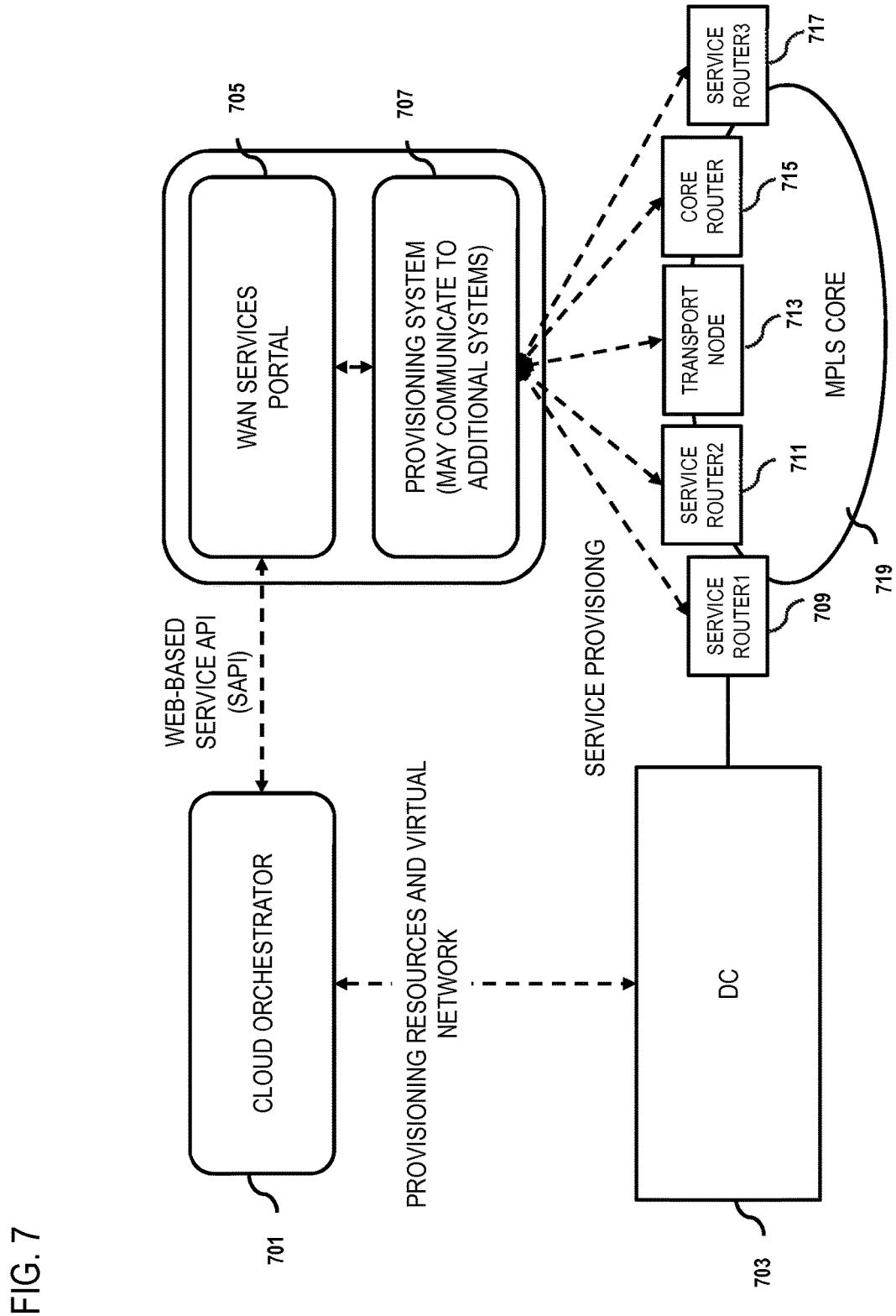
FIG. 7 is a diagram illustrating an orchestration of on-demand dynamic service provisioning flow for one or more communication services, according to one embodiment.

FIG. 3 is a flowchart of a process for determining a cloud provider identifier associated with a request and validating the request to provision one or more communication services, according to one embodiment. In one embodiment, the network manager 101 performs the process 300 and is implemented in, for instance, a chip set including a processor and a memory as shown in FIG. 7.

In step 301, the network manager 101 may determine a cloud provider identifier associated with a request to provision one or more communication services. In one embodiment, the network manager 101 may create, manage and manipulate cloud resources, i.e., compute, storage and network, in order to realize user requests in a cloud environment. Further, the network manager 101 may manage interconnection and interaction among cloud based unit. In one embodiment, the network manager 101 may process and/or facilitate a processing of information associated with one or more cloud service providers to cause, at least in parts, a dynamic provisioning of communication services. In one embodiment, one or more communication services may be virtual private network (VPN) services whereby the network manager 101 may cause, at least in part, a dynamic provisioning of VPN services from one or more cloud service provider to a client network. In one embodiment, the one or more virtual private network sessions may be established over a public data network according to a multiprotocol labeling switching protocol. In another embodiment, one or more communication services may be provisioning of bandwidth on demand. In one scenario, the conventional provisioning of bandwidth takes significant time, whereby the customer often request and purchase enough bandwidth to handle their peak communication needs. This translates into the clients paying for more bandwidth than is needed and creates wasted resources. Thereby, provisioning of network services, specifically bandwidth on demand satisfies the user's requirement while aiming at maximizing, at the same time, resource utilization and network revenue.

In step 303, the network manager 101 may validate the request by matching the cloud provider identifier against another copy of the cloud provider identifier associated with a session over which the provisioning request was received. In one embodiment, a valid request from a cloud service provider must pass a check, whereby the network manager 101 may validate the request to provision one or more communication services. In one embodiment, a cloud provider identifier may be a string entered by a cloud service provider that is included in every request from the cloud service provider for provisioning of one or more communication services. In one embodiment, the network manager 101 may match the cloud provider identifier of a request sending cloud service provider with another copy of the cloud provider identifier associated with a session to validate the request for provisioning one or more communication services. In one embodiment, the network manager 101 may cause, at least in part, an orchestration of one or more network systems based, at least in part, on the matching.

Figure 4:
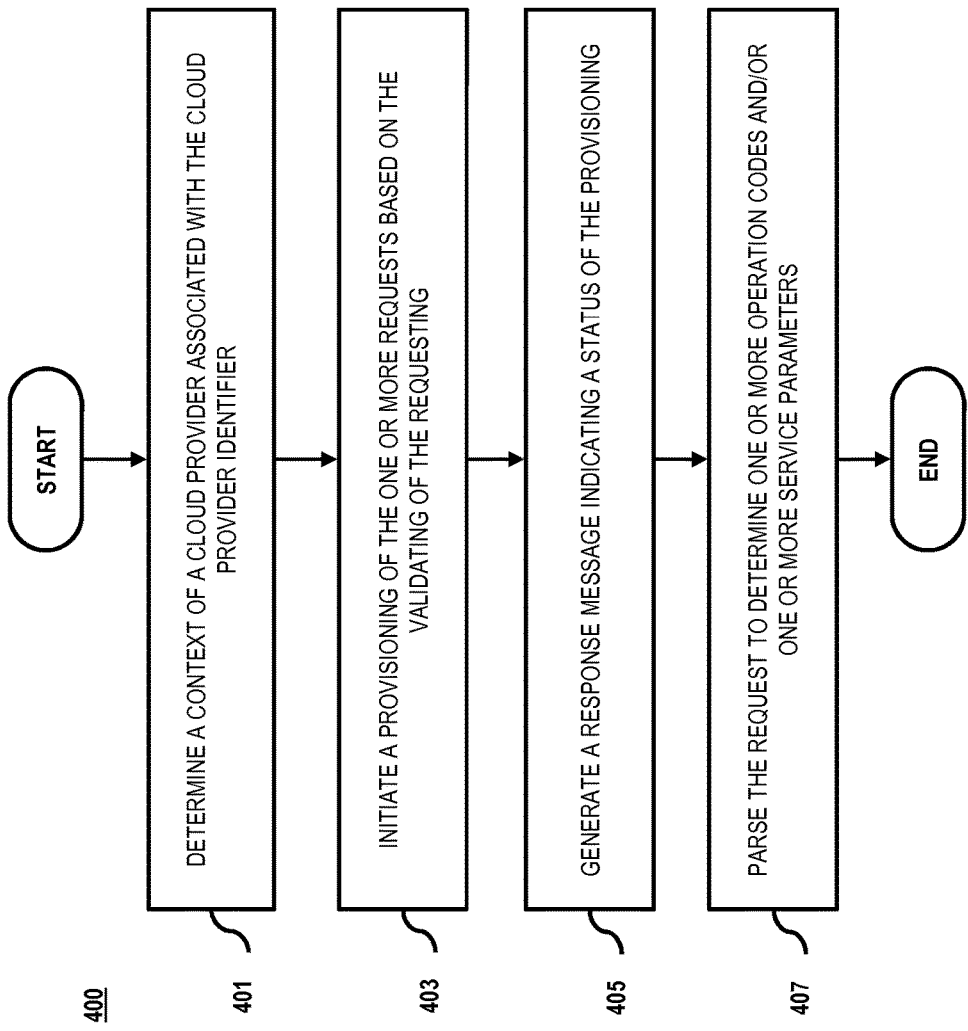
FIG. 4 is a flowchart of a process for generating a response message indicating a status of the provisioning based on the validating of the requesting, according to one embodiment.

FIG. 4 is a flowchart of a process for generating a response message indicating a status of the provisioning based on the validating of the requesting, according to one embodiment. In one embodiment, the network manager 101 performs the process 400 and is implemented in, for instance, a chip set including a processor and a memory as shown in FIG. 7.

In step 401, the network manager 101 determines a context of a cloud provider associated with the cloud provider identifier, wherein the validating of the request is further based on matching one or more parameters in the request against the context. In one embodiment, the one or more parameters include a customer identifier, a shared secret, service profile information, or a combination thereof. In one embodiment, a customer identifier may be a string assigned by a Network Service Providers (NSP) and shared with the customer. The customer may further share the customer identifier with the cloud provider at customer's will. The customer identifier must be included in every message and must match to that defined in the context of the cloud service provider. In one embodiment, a shared secret may be string selected by a customer and shared with the cloud service provider by the customer. A shared secret must be included in every message and must match to that defined in the context of the cloud service provider. In one embodiment, service profile information may be a set of rules associated with a cloud service provider, and must match that defined in the context of the cloud service provider. In one embodiment, the service profile information includes port handle information, an order type, a connection type, a service type, a connection identifier, circuit handle information, connection attribute information, or a combination thereof. In one embodiment, port handle information may be a physical UNI port handle assigned by NSP. In one embodiment, an order type may be a service creation/modification/deletion authorization. In one embodiment, a connection type may be Ethernet VLAN for provisioning of the one or more communication services. In one embodiment, a service type may be Ethernet Virtual Private Line (EVPL) for providing a point-to-point Ethernet connection, and/or Internet Protocol based Virtual Private Network (IPVPN) for sending and receiving data across shared or public networks as if they were an integral part of the private network with all the functionality, security and management policies of the private network, and/or Ethernet Private Line (EPL) for providing a point-to-point Ethernet Virtual Connection (EVC) between a pair of dedicated user network interfaces (UNIs), with a high degree of transparency, and/or Ethernet Virtual Private Network (EVPN) or Virtual Private LAN Service (VPLS) for providing Ethernet based communication allowing customers to manage their own routing over their virtual private network, and allowing geographically dispersed sites to share an Ethernet broadcast domain. In one embodiment, a connection identifier may be VLAN IDs for EVPL and EPL services. In one embodiment, circuit handle information may be a string assigned by NSP. In one embodiment, connection attribute information may be characteristics of the connection. In one scenario, transactions may occur at the connection level, for instance, the login timeout, or number of seconds to wait while trying to connect may be a connection attribute.

In step 403, the network manager 101 initiates a provisioning of the one or more requests based on the validating of the requesting. In one embodiment, the one or more criteria for dynamic provisioning of the one or more communication services may be based, at least in part, on the validation of the request by matching the one or more parameters in the request to the context of a cloud provider. In one embodiment, the network manager 101 initiates dynamic provisioning of network services, specifically VPN and bandwidth on demand. In other embodiments, the network manager 101 initiates provisioning based on the parameters explained below under the FIG. 7 description.

In step 405, the network manager 101 generates a response message indicating a status of the provisioning. In one embodiment, the status includes one or more success flags, one or more reject flags, one or more error codes, or a combination thereof. Each success flag, reject flag or error code may be associated with a circuit identification, parameters used, timestamp, performance requested, reason codes, error codes, or combination thereof.

In step 407, the network manager 101 parses the request to determine one or more operation codes, one or more service parameters, or a combination thereof, wherein the provisioning is further based on the one or more operation codes, the one or more service parameters, or a combination thereof.

Figure 5:
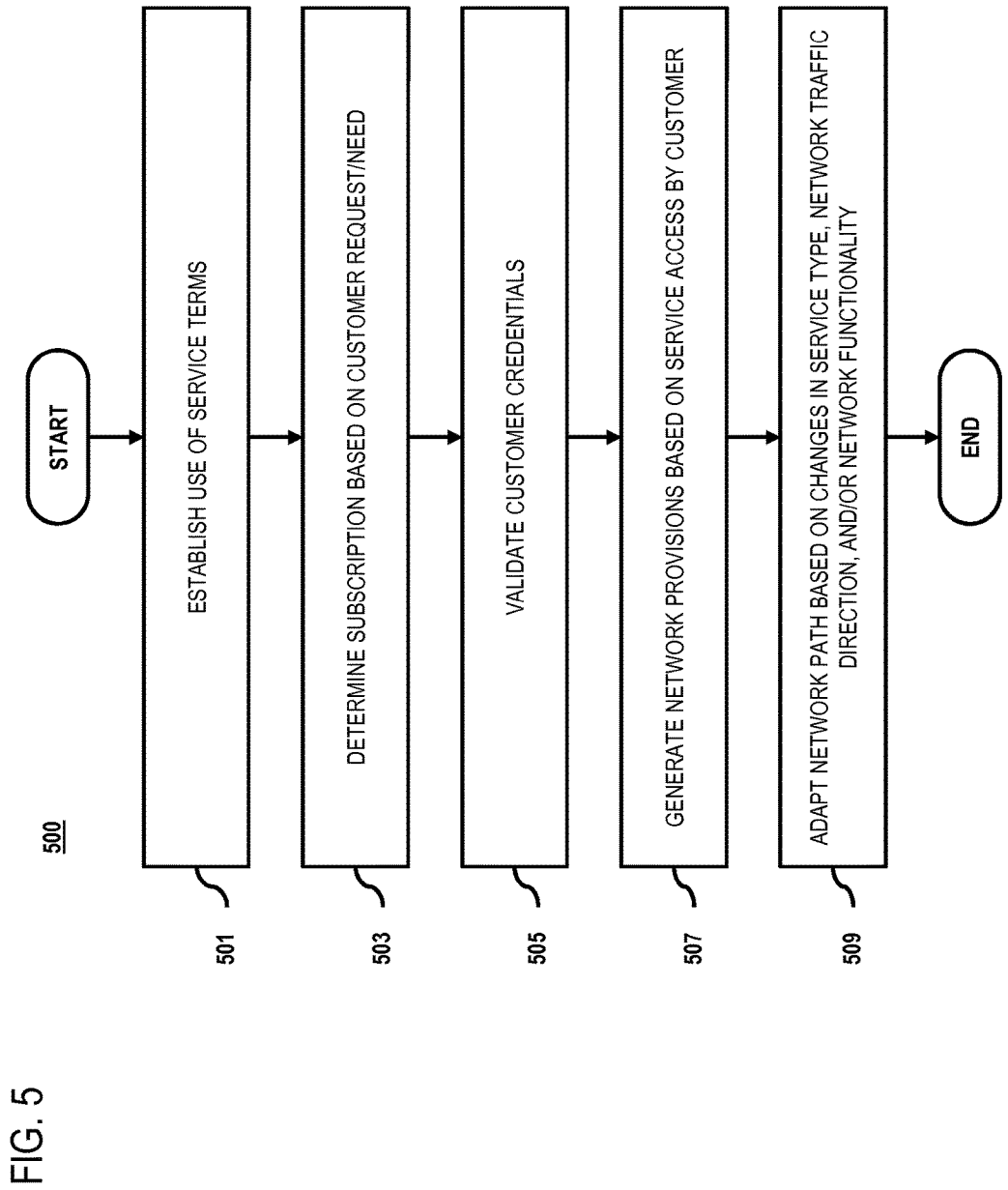
FIG. 5 is a flowchart of dynamically determining network services based on routing traffic, according to an exemplary embodiment.
Figure 8:
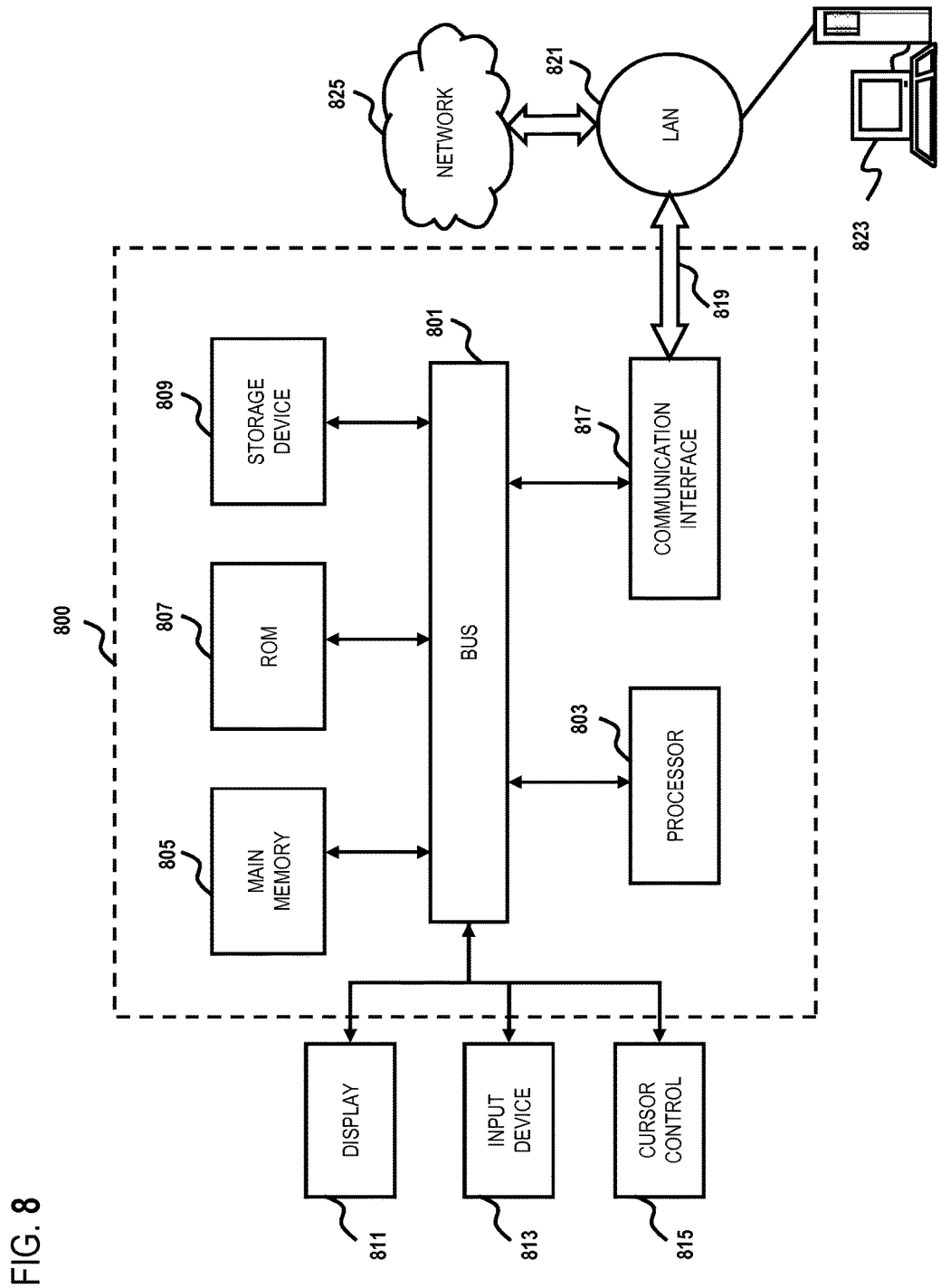
FIG. 8 is a diagram of a computer system that can be used to implement various exemplary embodiments.

FIG. 5 is a flowchart of dynamically determining network services based on routing traffic, according to an exemplary embodiment. In one embodiment, the network manager 101 performs the process 500 and is implemented in, for instance, a chip set including a processor and a memory as shown in FIG. 8.

In step 501, the network manager 101 may establish terms for customer services. These terms may be established by customer identifiers, shared secrets, locations, service profile information, connected services, bandwidth, etc. In this way, different customers and providers may establish services through different terms of service. For example, each customer may have different terms of service potentially based on infrastructure to use such services, cloud-provider, or prior established services.

In step 503, the network manager 101 may determine a customer profile upon customer identification in the request. The required services may also be determined based on the customer profile and/or customer request, that can be incoming through a cloud provider. For example, customers may request all different types of services including, but not limited to, firewalls, proxy chains, deep packet inspections, any needs that go beyond normal IP routing, etc.

In step 505, the network manager 101 may validate customer credentials through the cloud provider. This request may then be used to generate routing paths and network resource adaptations for customer use of the service requested.

In step 507, the network manager 101 may generate network provisions based on service access by customer and current network utilization. The current network utilization may determine how adjustments may be made to most effectively add the requested service. Previously requested services may also be used to determine priority and effective network resource provisioning by tying two similar services to the same network resource, or creating other similar solutions.

In step 509, the network manager 101 may adapt network path based on changes in service type, network traffic direction, and/or network functionality. Additional adjustments to the network provisions may be made based on changes in network utilization after service access by the customer. For example, should network traffic increase, services may be routed along less used routers.

Figure 6:
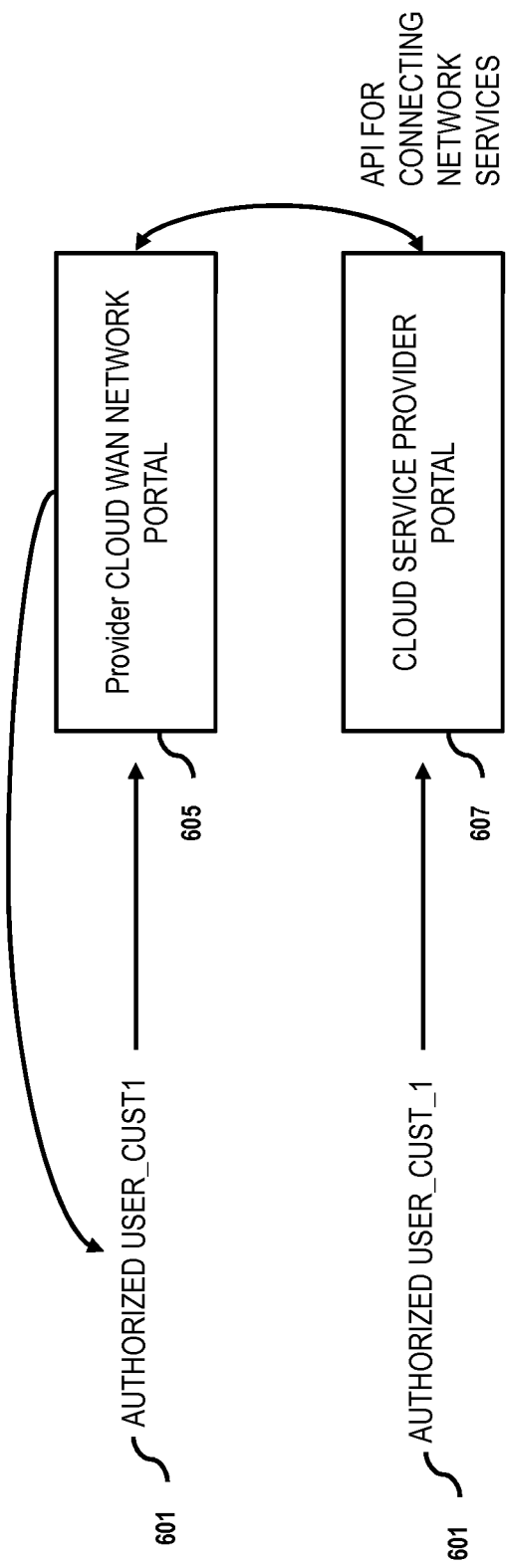
FIG. 6 is a diagram illustration of a private cloud services provisioning a network service, according to one embodiment.

FIG. 6, is a diagram illustration of cloud network services provisioning to a customer according to one embodiment. In one embodiment, an authorized customer 601 from a virtual private network may establish contract terms permitting a the network service provider 605 to provision a network service requested through a cloud service provider 607 via the Application programming Interface (API). Such step is followed by the network service provider 605 returning key information to the user which may include credentials to be used when ordering a cloud connectivity service through a cloud provider. On the other hand, the authorized customer 601 may order the network service from the service provider 605, including WAN connectivity to the cloud service provider, with SSO credentials, FIG. 7 is a diagram illustrating an orchestration of on-demand dynamic service provisioning flow, according to one embodiment. The efficiency and ubiquity of virtualization technologies have enabled widespread use of cloud computing platforms. While the basic Infrastructure-as-a-Service (IaaS) models of providing computing and storage services on-demand may be the mainstay of cloud computing, more sophisticated cloud service abstractions may be offered. For example, in one embodiment, the cloud computing includes utilization of a set of shared computing resources (e.g., servers) which are typically consolidated in one or more data center locations 703. In one embodiment, the cloud orchestrator 701 may create, manage and manipulate cloud resources, i.e., compute, storage and network, in order to realize customer requests in a cloud environment. Further, the cloud orchestrator 701 may manage interconnection and interaction among cloud based unit, and connectivity to the customer WAN network services via the Wide Area Networks (WAN) services portal 705.

In one embodiment, the network service provider 719, providing the customer WAN service, may be an Multiprotocol Label switched (MPLS) network composed of an MPLS core router 715, and service edge routers 1-3 709, 711, and 717 respectively, and may include transport node 713. All of which may relay information to the provisioning system 707 in order to more efficiently configure and use resources. The service routers 1-3 may be used to provide a service to customers and communicate with data centers and the provisioning system 707. The service routers 709, 711 and 717 may be used to relay different services to customers and relay information from data centers 707. The core router 715 may be used to relay data across the backbone. The transport node 713 may be used to transport links between service routers and core router. The Transport node 713c may also be used to provide a Layer 1 transport service among data centers or to customers.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
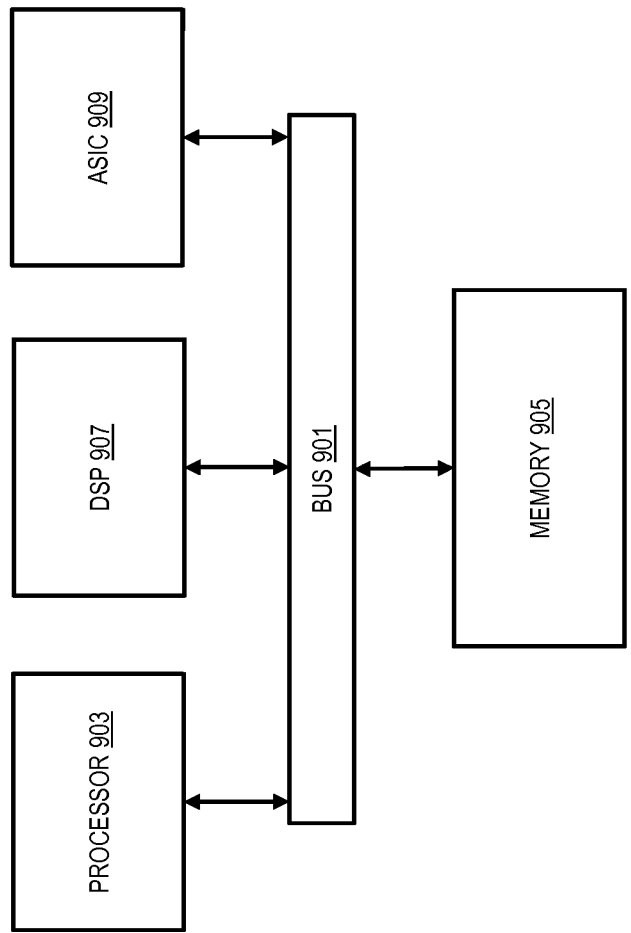
FIG. 9 is a diagram of a chip set that can be used to implement various exemplary embodiments.

FIG. 9 illustrates a chip set 900 upon which an embodiment of the invention may be implemented. Chip set 900 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 2-4, 7, and 9A-9D.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   establishing one or more terms of service for each customer of a cloud provider based on requirements associated with each customer and one or more cloud provider network provisions;
   receiving, from a customer of the cloud provider, a request for one or more communication services provided by the cloud provider;
   determining a customer profile corresponding to the customer based on customer identification included in the request;

identifying the one or more terms of service for the customer based on the customer profile;
identifying one or more credentials based on the customer profile;
validating the one or more credentials through the cloud provider; and
generating, in response to validating the one or more credentials, a routing path to the cloud provider based on the requested one or more communication services, the one or more terms of service for the customer, and current network utilization associated with the cloud provider.

2. A method of claim 1, wherein the routing path is generated based further on one or more of: the one or more provider network provisions, the cloud provider, a traffic level, a traffic direction, or a traffic type.

3. A method of claim 1, wherein the one or more provider network provisions include one or more of: a customer identifier, a shared secret, or service profile information.

4. A method of claim 3, wherein the service profile information includes one or more of: one or more services that can be connected, one or more services that are connected, a location, or a bandwidth.

5. A method of claim 1, wherein the customer profile is additionally based on one or more of: a customer identification, one or more networks, or one or more devices.

6. A method of claim 1, wherein identifying the one or more credentials is additionally based on the one or more provider network provisions.

7. A method of claim 1, further comprising:
regenerating the routing path based on one or more changes in a usage of the provider network.

8. A method of claim 7, wherein the one or more changes in the usage include one or more of: a router error, a traffic level having been met, or a subscription change.

9. A method of claim 8, further comprising:
providing a notification of changes in the usage of the provider network to management systems, nodes, or routers of the provider network.

10. An apparatus comprising:
a memory to store instructions; and
a processor configured to execute the instructions to:
establish one or more terms of service for each customer of a cloud provider based on requirements associated with each customer and one or more cloud provider network provisions;
receive, from a customer of the cloud provider, a request for one or more communication services provided by the cloud provider;
determine a customer profile corresponding to the customer based on customer identification included in the request;
identify the one or more terms of service for the customer based on the customer profile;
identify one or more credentials based on the customer profile;
validate the one or more credentials through the cloud provider; and
generate, based on validating the one or more credentials, a routing path to the cloud provider based on the requested one or more communication services, the one or more terms of service for the customer, and current network utilization associated with the cloud provider.

11. An apparatus of claim 10, wherein the routing path is generated additionally based on one or more of: the one or more provider network provisions, the cloud provider, a traffic level, a traffic direction, or a traffic type.

12. An apparatus of claim 10, wherein the one or more provider network provisions include one or more of: a customer identifier, a shared secret, or service profile information.

13. An apparatus of claim 12, wherein the service profile information includes one or more of: one or more services that can be connected, one or more services that are connected, a location, or a bandwidth.

14. An apparatus of claim 10, wherein the customer profile is additionally based on at least one or more of: a customer identification, one or more networks, or one or more devices.

15. An apparatus of claim 10, wherein the one or more credentials are identified additionally based on the one or more provider network provisions.

16. An apparatus of claim 10, wherein the processor further executes the instructions to:
regenerate the routing path based on one or more changes in the provider network usage.

17. An apparatus of claim 16, wherein the one or more changes in the provider network usage include one or more of: a router error, a traffic level having been met, or a subscription change.

18. A system comprising:
a network manager, implemented in hardware, configured to:
establish one or more terms of service for each customer of a cloud provider based on requirements associated with each customer and one or more cloud provider network provisions;
receive, from a customer of the cloud provider, a request for one or more communication services provided by the cloud provider;
determine a customer profile corresponding to the customer based on customer identification included in the request;
identify the one or more terms of service for the customer based on the customer profile;
identify one or more credentials based on the customer profile;
validate one or more credentials based on the cloud provider; and
generate, based on validating the one or more credentials, a routing path to the cloud provider based on the requested one or more communication services, the one or more terms of service for the customer, and current network utilization associated with the cloud provider.

19. A system of claim 18, wherein the routing path is generated based further on one or more of: the one or more provider network provisions, the cloud provider, a traffic level, a traffic direction, or a traffic type.

20. A system of claim 18, wherein the one or more provider network provisions include one or more of: a customer identifier, a shared secret, or service profile information.

* * * * *